United States Patent
Jin

(10) Patent No.: US 10,991,065 B2
(45) Date of Patent: Apr. 27, 2021

(54) METHODS AND SYSTEMS FOR PROCESSING GRAPHICS

(71) Applicant: Tencent Technology (Shenzhen) Company Limited, Shenzhen (CN)

(72) Inventor: Xiaodong Jin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/598,995

(22) Filed: Oct. 10, 2019

(65) Prior Publication Data

US 2020/0043126 A1 Feb. 6, 2020

Related U.S. Application Data

(63) Continuation of application No. PCT/CN2017/106936, filed on Oct. 19, 2017.

(51) Int. Cl.
*G06T 1/20* (2006.01)
*G06T 15/00* (2011.01)

(52) U.S. Cl.
CPC .............. *G06T 1/20* (2013.01); *G06T 15/005* (2013.01)

(58) Field of Classification Search
CPC .................... G06T 1/20; G06T 15/005
See application file for complete search history.

(56) References Cited

U.S. PATENT DOCUMENTS

| 8,687,010 B1 | 4/2014 | Battle |
| 2012/0081376 A1 | 4/2012 | Sowerby et al. |
| 2014/0132613 A1* | 5/2014 | Lassen ................ G06T 15/005 345/522 |

(Continued)

FOREIGN PATENT DOCUMENTS

| CN | 102253831 A | 11/2011 |
| CN | 102541531 A | 7/2012 |

(Continued)

OTHER PUBLICATIONS

Tencent Technology, ISRWO, PCT/CN2017/106936, Jul. 20, 2018, 6 pgs.

(Continued)

*Primary Examiner* — Grace Q Li
(74) *Attorney, Agent, or Firm* — Morgan, Lewis & Bockius LLP

(57) ABSTRACT

Method, system, and computer readable medium for processing graphics using an OpenGL Embedded Systems Application Programming Interface (Open GLES API) include: decoding a source graphic to generate a graphic object, where the graphic object includes a set of index values and a color palette; providing the graphic object to a Graphical Processing Unit (GPU) through the Open GLES API, including providing the set of index values in a first acceptable graphic format of the Open GLES API to the GPU, and providing the color palette in a second acceptable graphic format of the Open GLES API to the GPU; and triggering the GPU to render the source graphic according to the set of index values received in the first acceptable graphic format of Open GLES API and the palette received in the second acceptable graphic format of Open GLES API.

20 Claims, 10 Drawing Sheets

(56) References Cited

U.S. PATENT DOCUMENTS

| | | | | |
|---|---|---|---|---|
| 2016/0044139 A1* | 2/2016 | Lin | ................... | H04L 67/1095 |
| | | | | 709/203 |
| 2016/0283825 A1* | 9/2016 | Akenine-Moller | .... | H04N 19/94 |
| 2016/0350943 A1* | 12/2016 | Shin | ........................ | A63F 13/50 |
| 2017/0054988 A1* | 2/2017 | Lin | ..................... | H04N 19/159 |
| 2017/0139824 A1* | 5/2017 | Dragoljevic | ........ | G06F 12/0261 |
| 2017/0316540 A1* | 11/2017 | Gruber | ...................... | G06T 1/60 |
| 2018/0225846 A1* | 8/2018 | Kim | ......................... | G06T 1/60 |

FOREIGN PATENT DOCUMENTS

| | | |
|---|---|---|
| CN | 102867284 A | 1/2013 |
| CN | 102880465 A | 1/2013 |
| CN | 103713891 A | 4/2014 |
| CN | 105741228 A | 7/2016 |
| CN | 106354455 A | 1/2017 |
| CN | 106415607 A | 2/2017 |

OTHER PUBLICATIONS

Tencent Technology, IPRP, PCT/CN2017/106936, Apr. 21, 2020, 4 pgs.

* cited by examiner

512

The transforming includes 514:

transforming the set of index values received in the first acceptable graphic format into a set of intermediate color values, wherein each intermediate color value of the set of intermediate color values corresponds to a respective pixel in the original graphic

↓ obtaining a respective channel component value of each intermediate color value of the set of intermediate color values

↓ using the respective channel component value of each intermediate color value of the set of intermediate color values as a coordinate for sampling a respective color value of the color palette received in the second acceptable graphic format

↓ for each intermediate color value of the set of intermediate color values, assigning the respective color value that is sampled from the color palette according to the coordinate specified in the respective channel component value of the intermediate color value to the respective pixel of the source graphic that corresponds to the intermediate color value

Providing the set of index values in a first acceptable graphic format of the Open GLES API to the GPU includes 516:

extracting the set of index values from an image that is in an unacceptable graphic format of the Open GLES API

↓ providing the set of index values as an image that is in the first acceptable graphic format to the GPU Providing the color palette in a second acceptable graphic format of the Open GLES API to the GPU includes 518:

retrieving a position attribute of the color palette

↓ according to the position attribute, positioning the color palette of the graphic object

↓ extracting the color palette from the graphic object in accordance with a result of the positioning Providing the set of index values in the first acceptable graphic format of the Open GLES API to a first texture unit of the GPU 520

↓

Providing the color palette in the second acceptable graphic format of the Open GLES API to a second texture unit of the GPU, wherein the first texture unit is distinct from the second texture unit 522

Retrieving the source graphic includes 524:

converting an original image that is to be rendered at the device into the image in the indexed color format, wherein each pixel of the image in the indexed color format is represented as a respective index value that identifies a respective color of the color palette

504

Decoding the source graphics to generate the graphic object includes 526:

generating the set of index values of the graphic object in a form of a two-dimensional pixel matrix

FIG. 5D

| | Typical | Various Embodiments | |
|---|---|---|---|
| Various Graphic Format | RGBA Format Graphic | Source Graphic in the Indexed PNG Format | Source Graphic in the Indexed PNG Format |
| Decoding Method | Conventional decoding | ARGB_8888 decoding | Indexed decoding |
| Internal Memory Occupance (Bytes) | 1,638,400 | 1,638,400 | 409,600 |
| Average Decoding Time (ms) | 13.806 | 5.197 | 3.563 |
| Inputting Time through OpenGLES API to GPU (ms) | 1.996 | N/A | 1.278 |
| Graphic Rendering Time by GPU (ms) | 0.613 | N/A | 0.634 |

Table 1

FIG. 6

METHODS AND SYSTEMS FOR PROCESSING GRAPHICS

CROSS-REFERENCE TO RELATED APPLICATION

This application is a continuation application of PCT/CN2017/106936, entitled "METHODS AND SYSTEMS FOR PROCESSING GRAPHICS" filed on Oct. 19, 2017, which is incorporated herein by reference in its entirety.

TECHNICAL FIELD

The disclosed methods and systems relate generally to processing graphics, and more specifically, to processing graphics through an OpenGL for Embedded Systems (OpenGL ES) Application Programming Interface (API).

BACKGROUND

Graphics processing on a computing device transforms stored image data into a visible rendering of an image in accordance with one or more graphics process procedures that are dictated by the storage format and/or intermediate processing formats of the graphics required by the operating system and/or application software, as well as the application program interfaces (APIs) of the graphic processing units that perform the graphics data processing and rendering of the images.

Some image formats require more processing power and memory usage for certain operating systems and graphics processing APIs. Some image formats are not compatible or acceptable for certain operating systems and graphics processing APIs, without customized reprogramming or pre-processing of the images.

OpenGL ES is a commonly used computer graphics rendering program interface for rendering 2D and 3D graphics that are typically processed by a graphics processing unit (GPU). It is designed for embedded systems, such as smartphones, tablet computers, video game consoles, PDAs, etc. due to its relative lightweight and small footprint. OpenGL ES (e.g., OpenGL ES 2.0) is based on a corresponding OpenGL version (e.g., 2.0) but eliminates many of its fixed-function rendering pipelines. As a result, many commonly used graphics storage formats are not accepted as graphics inputs by the GPU through the formally defined OpenGL ES API, thereby limiting the utility of OpenGL ES, particularly, on mobile devices.

There is a need therefore, for improved methods, and particularly for small, handheld devices that implement the OpenGL ES API to process graphics and circumvent at least some of the limitations imposed by the OpenGL ES API.

SUMMARY

Some operating systems (e.g., Android operating system) have poorer performing when processing images stored in certain graphics formats (e.g., Portable Network Graphics (PNG) format). This problem is especially pronounced when rendering special visual effects and when the Graphics Processing Units (GPUs) are used repeatedly or frequently during real-time rendering of graphics. In such scenarios, decoding properties of graphics become crucial to the performance of the device. The present disclosure introduces a way to improve the processing performance of the GPU for those formats that have poor processing performance (e.g., improving the decoding properties of PNG format graphics through OpenGL ES on the Android platform).

A PNG image is decoded according specially designed parameters, and as a result decoding speed, memory usage are all improved. However, the result of the special decoding returns an indexed bitmap object (e.g., a Java object such as an android.graphics.Bitmap) that is not a data type that is acceptable according to the formal OpenGL ES API definitions on the Android platform, and cannot be used directly by the GPU for rendering. The present disclosure provides a method inputting the result of the decoding (e.g., an android.graphics.Bitmap object) which is in an unacceptable input data format into the GPU, and allowing the GPU to render the appropriate graphics corresponding to the original PNG image.

In some embodiments, a method for processing graphics using an OpenGL Embedded Systems Application Programming Interface (Open GLES API), includes: at a device including one or more processors and memory: retrieving a source graphic; decoding the source graphic to generate a graphic object, wherein: the graphic object comprises a set of index values and a color palette, the set of index values includes a respective index value for each pixel of the source graphic, and the respective index value for each pixel of the source graphic identifies a corresponding color in the color palette for the pixel of the source graphic; providing the graphic object to a Graphical Processing Unit (GPU) through the Open GLES API, including providing the set of index values in a first acceptable graphic format of the Open GLES API to the GPU, and providing the color palette in a second acceptable graphic format of the Open GLES API to the GPU; and triggering the GPU to render the source graphic according to the set of index values received in the first acceptable graphic format of Open GLES API and the palette received in the second acceptable graphic format of Open GLES API.

The aforementioned methods may be performed by a portable having a display, a processor, memory and one or more programs or sets of instructions stored in the memory for performing these methods.

BRIEF DESCRIPTION OF THE DRAWINGS

For a better understanding of the invention, reference should be made to the following detailed description taken in conjunction with the accompanying drawings, in which:

FIGS. 5A-5D are flowchart diagrams of exemplary methods for processing graphics in accordance with some embodiments.

FIG. 6 illustrate exemplary performance improvements that are achievable by the disclosed methods in accordance with some embodiments.

Like reference numerals refer to corresponding parts throughout the drawings.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
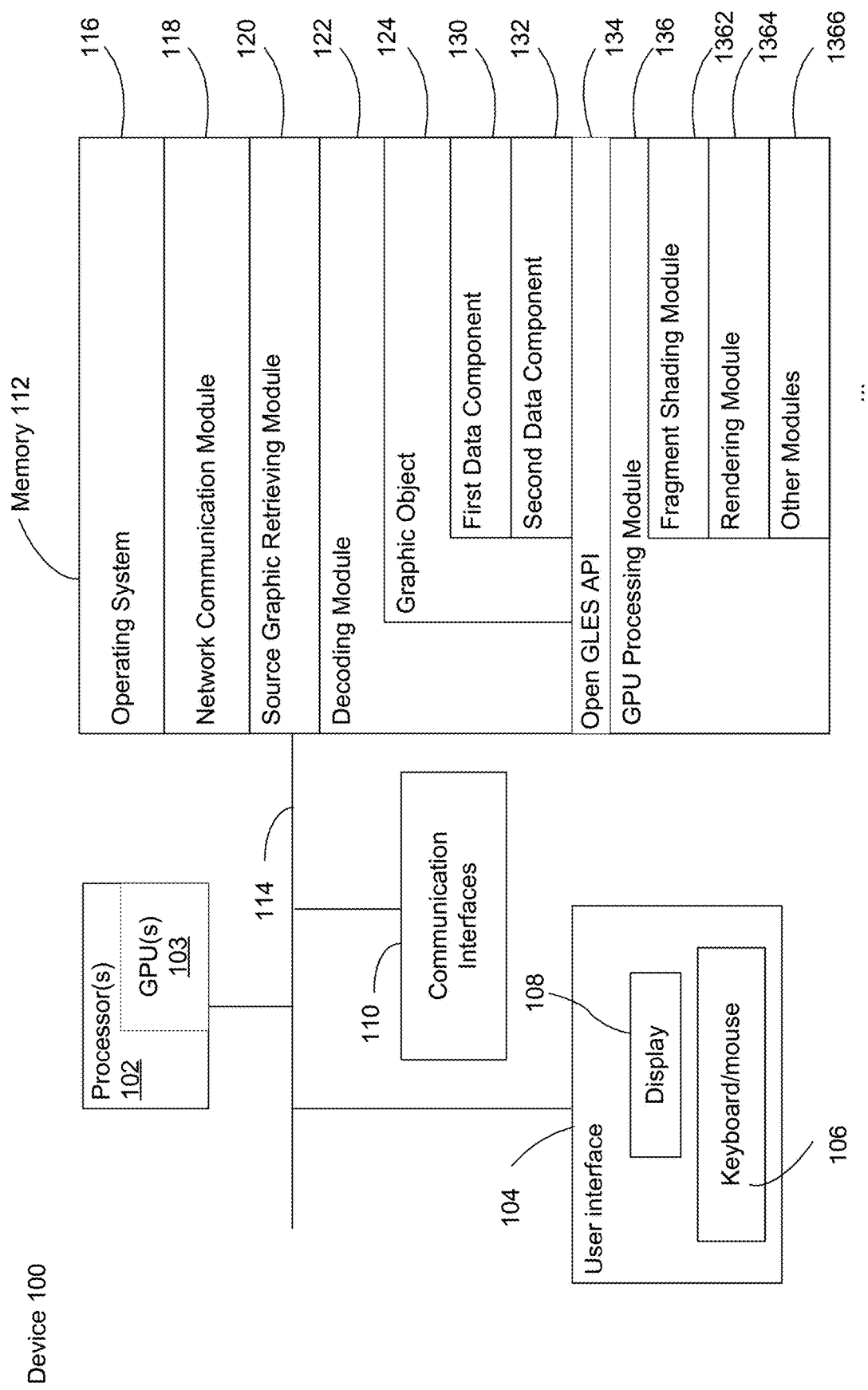
FIG. 1 is a block diagram of an exemplary device in accordance with some embodiments.

FIG. 1 is a diagram of an example implementation of a device 100 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the device 100 includes one or more processing units (CPU's) 102, user interface 104 for accepting external inputs (e.g., including a keyboard and mouse 106) and providing outputs (e.g., including a display 108), one or more network or other communications interfaces 110, memory 112, and one or more communication buses 114 for interconnecting these and various other components. The communication buses may include circuitry (sometimes called a chipset) that interconnects and controls communications between system components. The memory 112 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 112 may optionally include one or more storage devices remotely located from the CPU(s) 102. The memory 112, including the non-volatile and volatile memory device(s) within the memory 112, comprises a non-transitory computer readable storage medium.

In some implementations, the memory 112 or the non-transitory computer readable storage medium of the memory 112 stores the following programs, modules and data structures, or a subset thereof including an operating system 116, a network communication module 118, and a source graphic retrieving module 120 for retrieving a source graphic in an original format. In accordance with some embodiments, the operating system 116 includes procedures for handling various basic system services and for performing hardware dependent tasks. In accordance with some embodiments, the network communication module 118 facilitates communication with other devices via the one or more communication interfaces 110 (wired or wireless) and one or more communication networks, such as the Internet, other wide area networks, local area networks, metropolitan area networks, and so on. In some embodiments, the source graphic retrieving module 120 is optionally invoked by a software program or the operating system 116 to identify the graphics file to be rendered at the device 100.

In some embodiments, the memory 112 further includes decoding module 122 which converts the retrieved source graphic from its original file storage format into a data object (e.g., graphic object 124) which includes a first data component 130 and a second data component 132.

In some embodiments, the memory 112 further includes instructions that implements the OpenGL ES API that processes graphics in accordance with predefined definitions of the API. In some embodiments, the memory 112 further includes GPU processing module 136 that includes submodules such as the fragment shading module 1362, the rendering module 1364, and other modules 1366 that are instructions, when executed by the graphical processing unit(s) 103 of the processors 102, converts the image data in the original source graphic into visible images shown on the display 108.

The disclosure in various embodiments is a graphic processing method and a device (e.g., a device 100 in FIG. 1) using the graphic processing method. In some embodiments, the device 100 includes one or more processors 102 and memory 112 (e.g., as illustrated in FIG. 1). The memory 112 stores instructions which can be executed by the processors 102 to implement the graphic processing method.

In some embodiments, the graphic processing method (for example, as illustrated in FIGS. 2, 3, 4, 5A-5D) can be implemented to process a source graphic (e.g., source graphic 210 in FIG. 3) with an original format (e.g., a graphics file storage/compression format such as .BMP, .JPEG, .GIF, .PNG, .TIFF, etc.). As mainly illustrated in exemplary FIGS. 2 and 3, a retrieved source graphic 210 is decoded to generate a graphic object 220 with a different format (e.g., a data format that includes the raw image data), which might not be acceptable for the graphic API 134 (e.g., OpenGL API and/or Open GLES API) to transmit to the graphic processing units (GPU) 103 for further rendering. The graphic object 220 can be further transformed into suitable component objects 230, each of which is structured in accordance with various acceptable formats of the API 134. When the GPU 103 takes the component objects 230 as graphics input through the API 134, the GPU renders a graphic 240 using the data represented in component objects 230 which is also the graphic embodied in the original source graphic 210. The rendering is performed with a highly improved performance to generate the graphic 240 for display. The improved performances, whether hardware performance or software performance, such as those listed in FIG. 6 can be achieved. For example, the source graphic in the Indexed PNG format can be rendered in accordance with the presently disclosed techniques with improvements to the internal memory occupancy, the average graphic decoding time by the processors, the inputting time from the API to the GPU, and the GPU graphic rendering time by the GPU. The performance improvements makes differences in real-time processing of a large amount of graphics data, such as real-time processing frames of a video with special visual effect, real-time interactive online gaming display rendering, etc.

The graphic processing method can be implemented at a device operated under different operating systems, such as the Android operating system (hereinafter, Android), and the iOS operating system developed by Apple, Inc. Due to various graphic format constraints imposed by the different operating systems, the API and/or the GPU, it is desirable to select a suitable graphic format and a proper graphic format transformation for inputting the source graphic, rendering the graphic using the GPU, and outputting an image corresponding to the source graphic. Also, different graphic formats need different graphic decoding methods, and may also be input in different manners to the GPU through the API for rendering in different ways.

In some embodiments, the graphic processing method can be implemented at a device operated under the Android operating system. Due to various graphic format constraints imposed by the Android operating system, it is desirable to select a suitable graphic format and a proper graphic format transformation for inputting the source graphic, rendering the graphic using the GPU, and outputting an image corresponding to the source graphic. In some embodiments, the source graphic is an image frame from a video, an image of a logo, and/or an image of a background for a user interface. In some embodiments, the source graphic is provided with PNG format, alternatively, the BMP format, or the JPEG format, etc. In some embodiments, the source graphic is an image in an indexed color format (e.g., an indexed PNG format). The source graphic is generated by converting an original image that is to be rendered at the device into the image in the indexed color format. Each pixel of the image in the indexed color format is represented as a respective index value that identifies a respective color of a predefined color palette. In some embodiments, a source graphic file with the indexed color format combines the color palette and a set of index values.

Citing the source graphic in the PNG format as an example (e.g., source graphic stored as a .PNG file or in accordance with the .PNG file format), the Android supports and/or accepts the PNG format graphics file as the following four image object types, i.e., Alpha_8, RGB_565, ARGB_4444, ARGB_8888, and indexed color format (e.g., image data formats in memory as opposed to file storage types). The above four image data formats differ in information unit size (e.g., number of bits per pixel) and thus resulting in different memory usage for storing the image data for the same PNG image. Different graphic data formats also need different graphic decoding methods. For example, in the case of the source graphic in the indexed PNG format, there are different decoding methods. The image formats and size of the indexed PNG format graphic, accompanied with different graphic decoding methods, determine the performance of the decoding, the inputting to GPU through API, and the GPU rendering, which is clearly reflected in FIG. 6. For example, when the RGBA format graphic is decoded using the conventional format accepted by the OpenGL ES API, the memory usage, the decoding time, and the input time through the OpenGLES API to the GPU, and the graphics rendering time are all much larger than when the source graphic in the indexed PNG format is decoded into data in the indexed color format, and inputted to the GPU using the methods described herein. When the methods described herein are not used, for example, when the indexed PNG source graphic is decoded into the ARGB_8888 data format, the data is simply not acceptable by the OpenGL API and cannot be utilized by the GPU. In some embodiments, the performance makes differences when the GPU is needed in real-time processing of a large amount of graphic data, such as in real-time processing of frames of a video with special visual effect, or real-time interactive online gaming display rendering, etc.

In some embodiments, when the graphic processing method is executed under the Android operating system, the Android operating system provides two different graphic decoding methods for the indexed PNG format graphic to generate a graphic object (e.g., a Java data object). One method, which is named as ARGB_8888 decoding as shown in FIG. 6, is to use a function "BitmapFactory.decode( )" with a default parameter setting to obtain an android.graphics.Bitmap object. The other method, which is named as indexed decoding as shown in FIG. 6, is to use a function "BitmapFactory.decode( )" with a particular parameter setting (e.g., options.inPreferredConfig=null) to obtain an android.graphics.Bitmap object with a set of indexed values and a color palette, which can be referred to as an indexed color format android.graphics.Bitmap object. The indexed color format android.graphics.Bitmap object is a Java object and the color palette may be stored in the Java native layer. Compared to the android.graphics.Bitmap object in the ARBG_8888 format, the indexed color format android.graphics.Bitmap object show much improvement in many aspects of graphic processing performance (as shown in FIG. 6). In some embodiments, by implementing the latter method, the process of decoding the source graphics to generate the graphic object includes generating the set of index values of the graphic object in a form of a two-dimensional pixel matrix, where each cell of the matrix corresponds to a pixel in the source graphic and stores an index value for a color in the predefined color palette in accordance with the color of the original image graphic at that pixel.

Not every graphic format after decoding is supported by the API to the GPU due to constrains imposed by the input definitions of the API. In other words, according to different graphic formats decoded in different graphic decoding methods, the graphic processing method might choose different ways to transmit graphic data to the GPU through the API (e.g., OpenGL API and/or Open GLES API). In some embodiments, when executing the graphic processing method under the Android operating system, the graphic processing method uses an OpenGL Embedded Systems Application Programming Interface (Open GLES API) to transmit graphic data to the GPU. Not every graphic format is supported by this API (e.g., Open GLES API) to transmit data to the GPU due to format incompatibility. In this situation, the graphic format needs to be changed into a format acceptable and transmittable by the Open GLES API. When decoding the source graphic to generate the graphic data (e.g., the graphic object 220 in FIGS. 3-4), the graphic data cannot be acceptable and transmittable by the Open GLES API in accordance with the API definitions in a conventional manner, and a different way other than the conventional way to transmit the graphic data (e.g., as referenced by steps C, C1, C2 in FIGS. 2, 3, 4, 5A-5D) need to be used.

Figure 4:
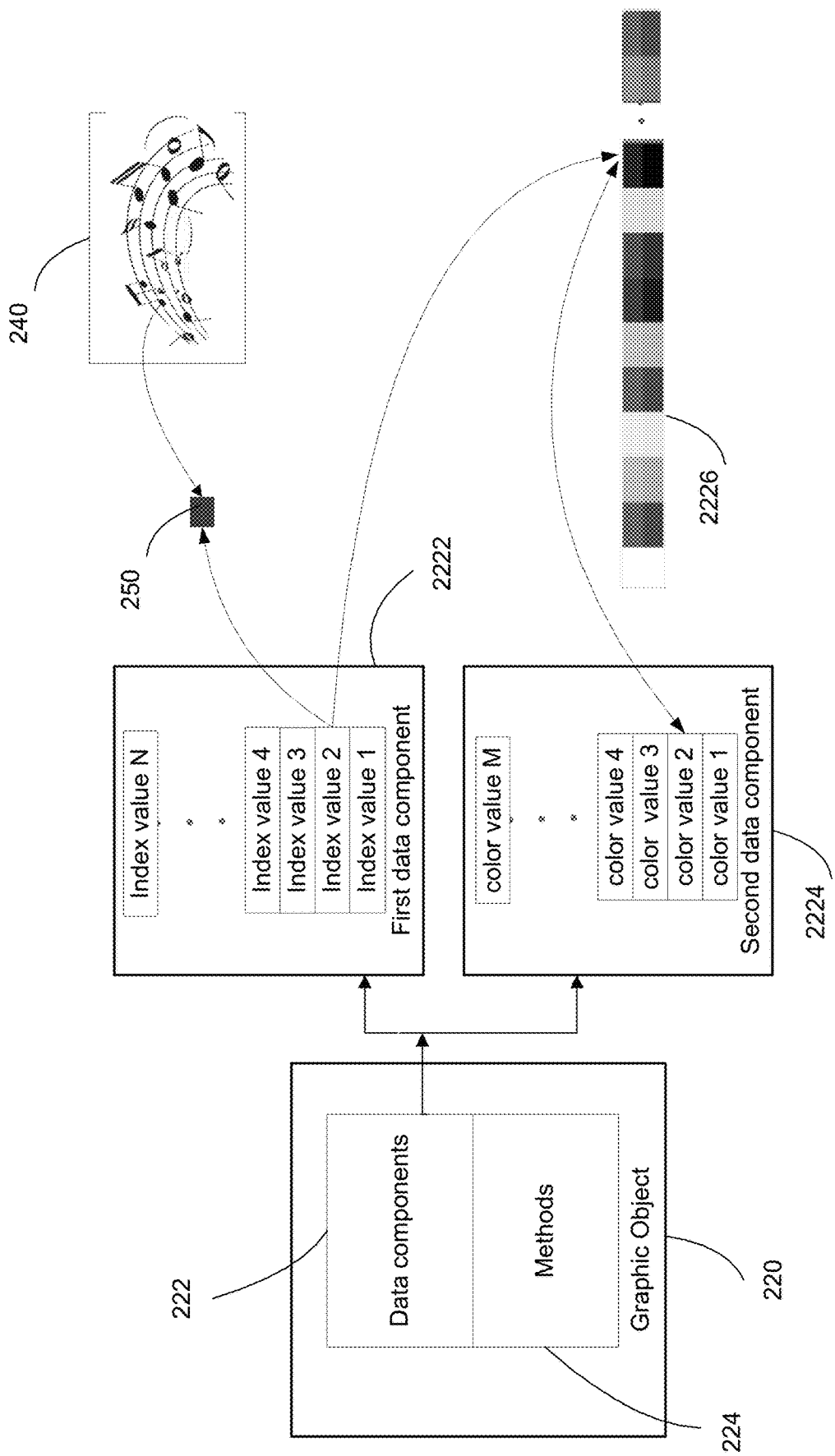

In some embodiments, a graphic object generated by the method decoding the source graphic is a data object of another data type that does not conform to any of the data input formats of the API (e.g., OpenGLES API). In some embodiments, the graphic object includes a set of index values and a color palette. The set of index values includes a respective index value for each pixel of the source graphic, and the respective index value for each pixel of the source graphic identifies a corresponding color in the color palette for the pixel of the source graphic. In some embodiments, as illustrated in FIG. 4, the graphic object 220 is a Java object including data components 222 and methods 224. Using the methods 224 of the graphic object 220, a first data component 2222 and a second data component 2224 are extractable from the data components 222. The first data component 2222 includes a set of index values. The set of index values includes a respective index value for each pixel of the source graphic 210, and the respective index value for each pixel of the source graphic 210 identifies a corresponding color in a color palette 2226 for the pixel of the source graphic 210. In some embodiments, the color palette is a java native color palette. In some embodiments, the color palette is part of the data components 222 and is extracted from the data components 222 using the methods 224 of the graphic object. The second data component 2224 includes a set of colors identified from the color palette for each pixel of the source graphic in accordance with the index value of that pixel in the first data component 2222. The graphic object is in a graphic format that does not conform to any of the data input formats of the API (e.g., OpenGLES API). In some embodiments, the graphic object is an android.graphics.Bitmap object or an indexed android.graphics.Bitmap object. As illustrated in FIG. 4, the indexed android.graphics.Bitmap object has a first data component 2222 that is a one-dimensional array of index values, and another data component 2224 that is a one-dimensional array of color values, and the android.graphics.Bitmap object provides the functions (e.g., methods 224 in FIG. 4) for accessing and extracting the data components 2222, 2224. In some embodiments, a set of specially designed codes is used to extract the data components and the color palette from the android.graphics.Bitmap object.

For continuing the graphic processing, the graphic data in the graphic object needs to extracted and input into the GPU in an acceptable and transmittable format of the API (e.g., the Open GLES API, the Open GL API) to the GPU. In some embodiments, the device determines whether the format of the graphic object is compatible with the API before directly input the graphic object through the API in the GPU. In accordance with the determination, the device triggers the transmission of the graphic object in accordance with the input definition of the API if the format is compatible, or triggers the format disguise and/or format transformation as described herein before inputting the image data through the API. In some embodiments, no determination occurs beforehand, the format transformation is triggered when an error of inputting the graphic object through the API is detected. In some embodiments, the graphic format of at least one portion of the data components of the graphic object is transformed. In some embodiments, all data components of the graphic object are transformed. The data components can have their formats partially or entirely transformed according to actual requirements.

Figure 2:
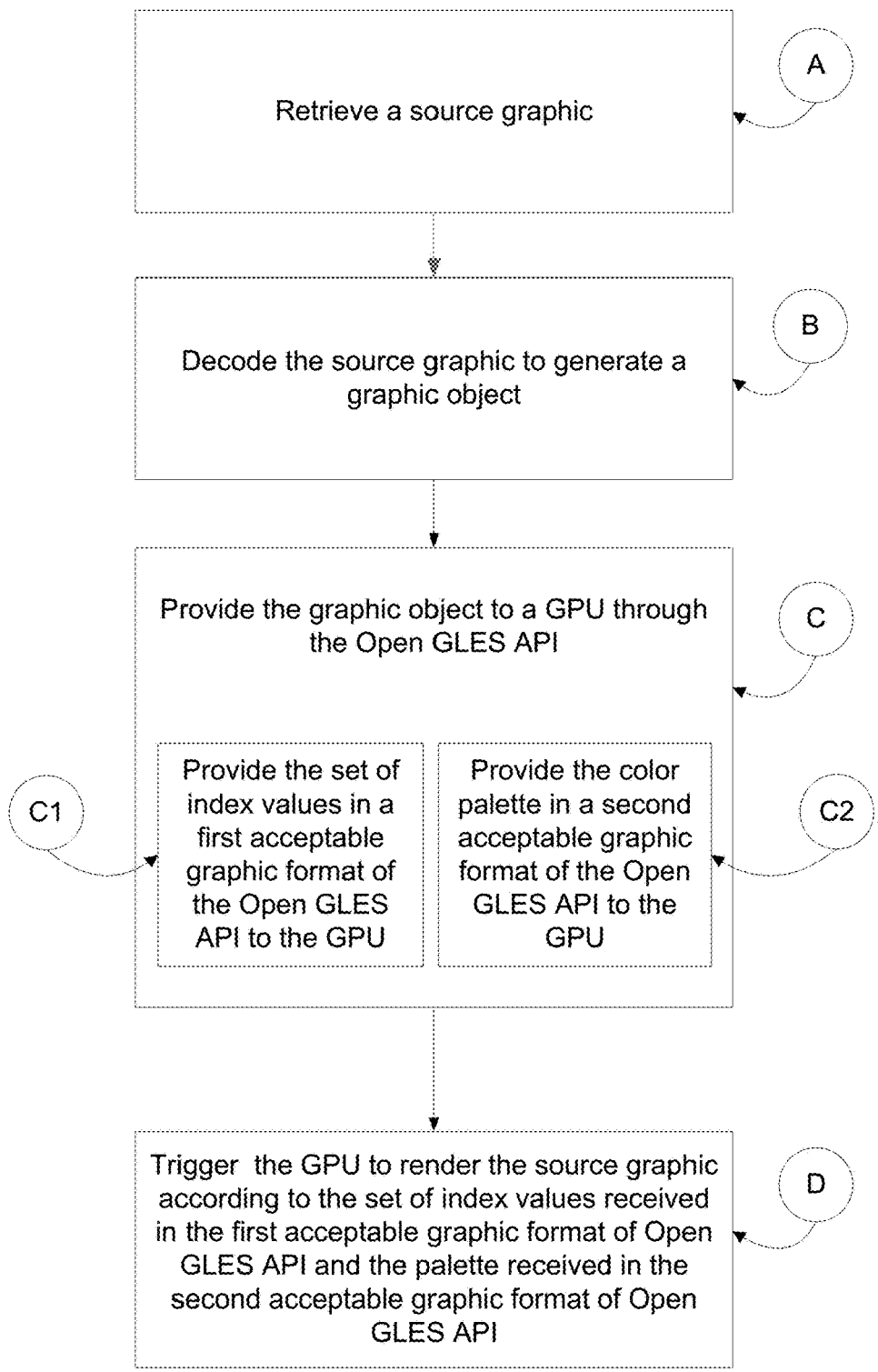
FIG. 2 is a flowchart diagram of an exemplary method for processing graphics in accordance with some embodiments.
Figure 3:
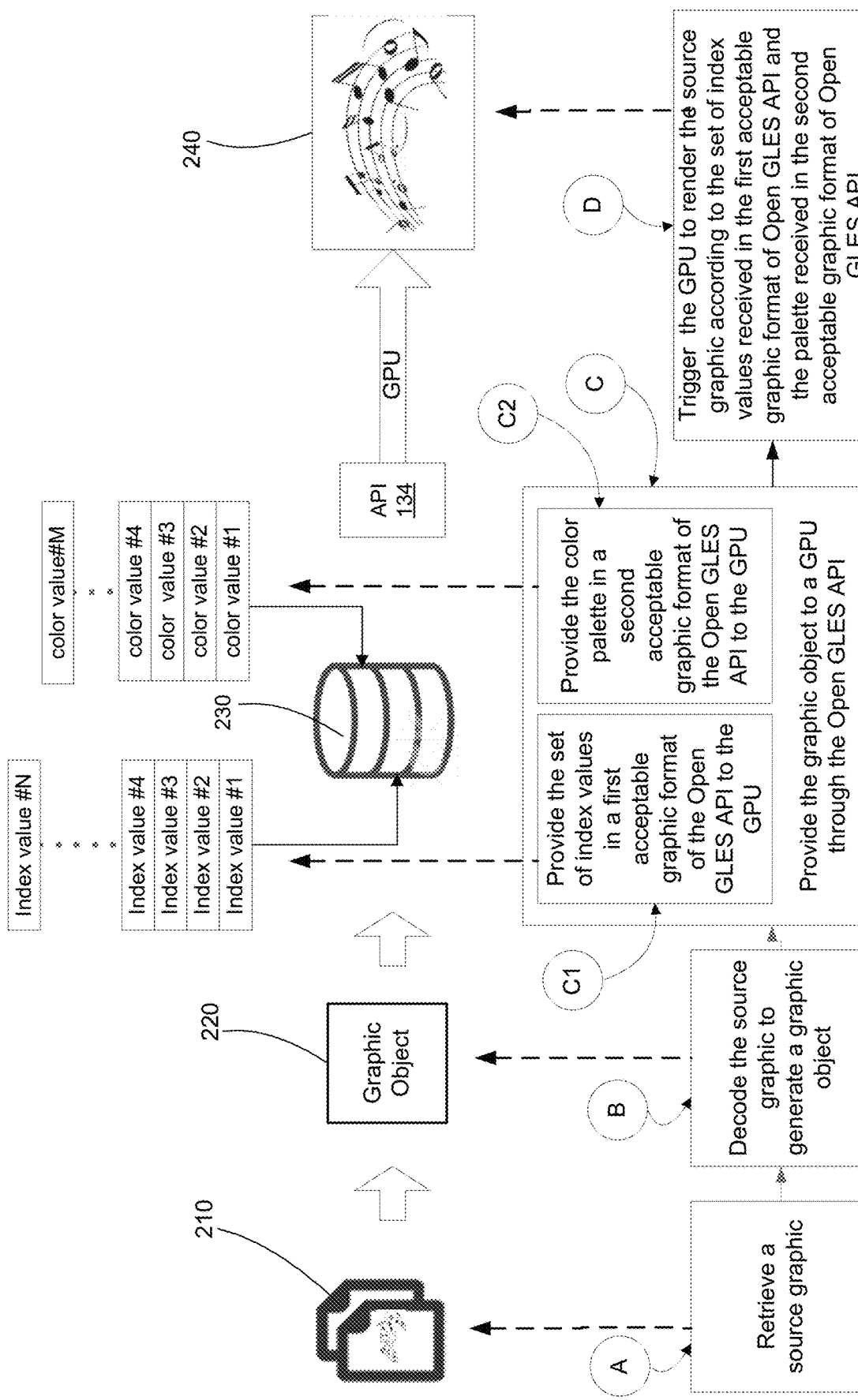
FIGS. 3-4 are block diagrams illustrating the processing of a source graphic in accordance with some embodiments.
Figure 5A:
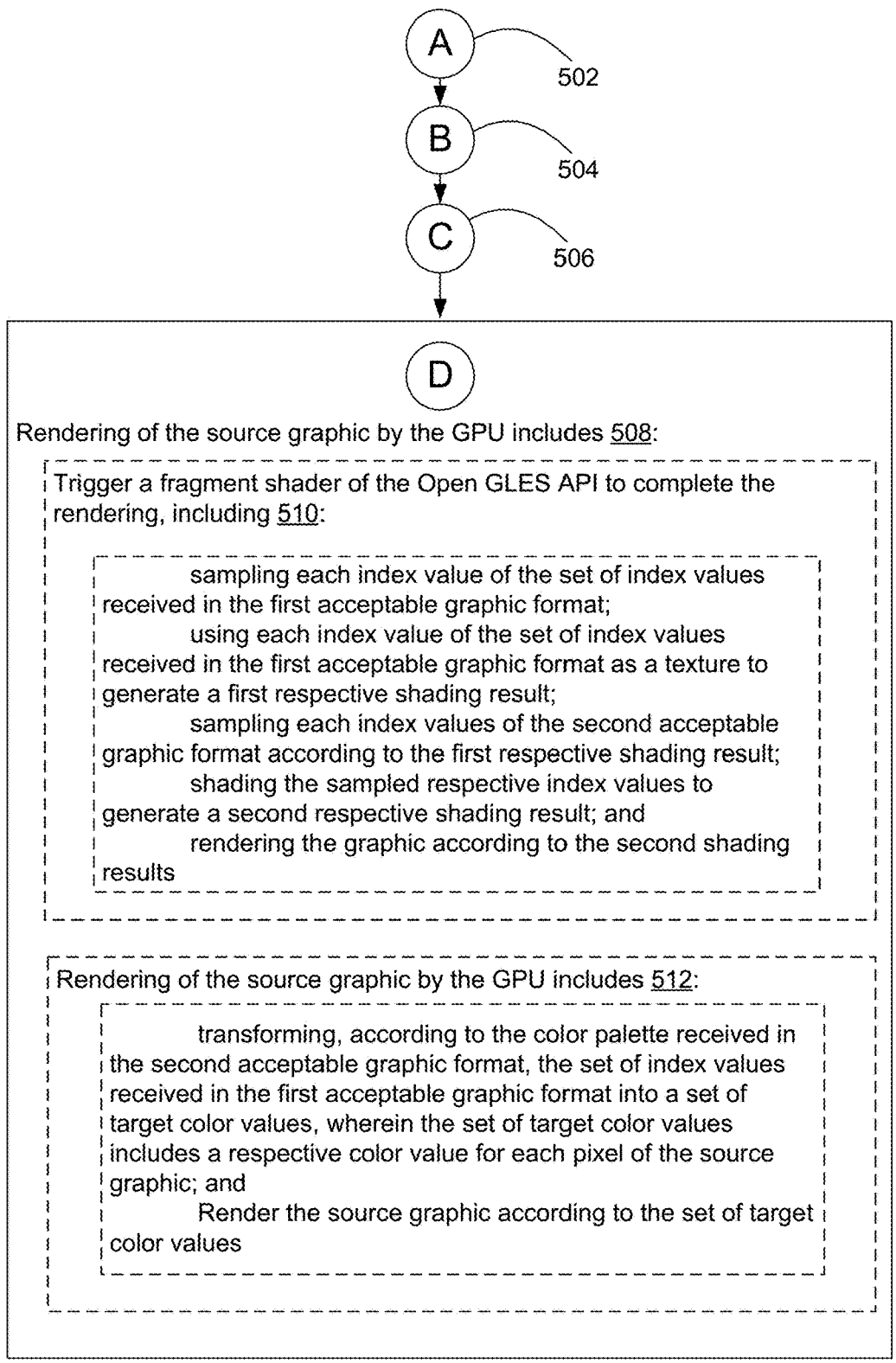

In some embodiments, as referenced by C, C1, C2 in FIGS. 2, 3, 5A, the set of index values is provided with a first acceptable graphic format of the Open GLES API to the GPU (e.g., stored in a first texture unit of the GPU), and the color palette is provided in a second acceptable graphic format of the Open GLES API to the GPU (e.g., stored in a second texture unit of the GPU). In some embodiments, the first and second texture units are stored in the physically internal memory of the GPU for storing the transmitted graphic data through the API. The first texture unit is distinct from the second texture unit in the GPU. If the original format of the graphic object is not acceptable by the API, the graphic object in the original format needs to be converted to data components, and the data components are input to the GPU with the first acceptable graphic format and the second acceptable graphic format, respectively. If acceptable, the original graphic format can be first and/or second acceptable graphic format. In some embodiments, the first data component 2222 (e.g., the index values) of the android.graphics.Bitmap object is input through the Open GLES API as an image encoded in a single channel image format (e.g., the Alpha_8 format). In other words, the index values of the graphic object is disguised as a one dimensional image itself and input into the GPU through the Open GLES API. When there is format transformation of the graphic object, some labeling differences between FIG. 3 and FIG. 4 indicate the format differences. In FIG. 4, the exemplary first component 2222 includes an exemplary array of index values, which are labeled as Index value 1, Index value 2, Index value 3, Index value 4, . . . Index value N. However, in FIG. 3, after format transformation, the exemplary array of index values, which is ready to transmit, are labeled as Index value #1, Index value #2, Index value #3, Index value #4, . . . Index value #N.

In some embodiments, the second data component 2224 (e.g., the color palette) of the android.graphics.Bitmap object is input as a two-dimensional texture. In other words, the palette of the original graphic object is disguised as a two-dimensional texture and input into the GPU through the Open GLES API. When there is format transformation of the graphic object, some labeling differences between FIG. 3 and FIG. 4 indicate the format differences. In FIG. 4, the exemplary second component 2224 includes an exemplary array of color values, which are labeled as color value 1, color value 2, color value 3, color value 4, . . . color value M. However, in FIG. 3, after format transformation, the exemplary array of index values, which is ready to transmit, are labeled as color value #1, color value #2, color value #3, color value #4, . . . color value #M. In some embodiments, the first acceptable graphic format can be distinct from the second acceptable graphic format. For example, the Alpha_8 format is distinct from the two-dimensional texture format of the color palette.

In some embodiments, the set of index values is extracted from a graphic object in an unacceptable graphic format of the API (e.g., OpenGLES API) and transformed as an image in the first acceptable graphic format and provided to the GPU. In some embodiments, the graphic object provides the functions (e.g., methods 224 in FIG. 4) for accessing and extracting the data components (e.g., the first data component 2222 in FIG. 4), which includes the set of index values. A set of specially designed codes is used to extract the data components from the graphic object (android.graphics.Bitmap object). In some embodiments, the first acceptable graphic format is a single channel graphic format (e.g., Alpha_8). In some embodiments, the respective index value of the graphic object for each pixel of the source graphic is stored as a single translucency value of the single channel graphic format. The single translucency value of the single channel graphic format is acceptable for the OpenGLES API, however, the indexed values of the graphic object is unacceptable for the OpenGLES API as index values for the indexed color format. In some embodiments, the unacceptable graphic format is an original graphic format of the graphic object (e.g., the android.graphics.Bitmap object) that is generated during the decoding of the source graphic. In some embodiments, the unacceptable graphic format for the graphic object is not the original graphic format, and may be another unacceptable graphic format formed by additional processing of the graphic object.

In some embodiments, as also referenced by C, C2 in FIGS. 2, 3 and 5A, the color palette (e.g., a one-dimensional array of color values) is extracted from the graphic object (e.g., the android.graphics.Bitmap object), and is provided in a second acceptable graphic format (e.g., two-dimensional texture format) of the API (e.g., Open GLES API) to the GPU. In some embodiments, the graphic object provides the functions (e.g., methods 224 in FIG. 4) for accessing and extracting the data components (e.g., the second data component 2224 in FIG. 4), which includes the set of color values. A set of specially designed codes is used to extract the data components from the graphic object (android.graphics.Bitmap object). In some embodiments, for extracting the color palette, a position attribute of the color palette is retrieved. According to the position attribute, position the color palette of the graphic object. The positioned color palette can be extracted from the graphic object (e.g., using a native function of the graphic object). In some embodiments, the position attribute is an offset value identifying a location of the color palette in the graphic object. The color palette can be extracted by offsetting from a data header of the graphic object according to the offset value. In some embodiments, for the graphic object being Java object (e.g., android.graphics.Bitmap object), when the position attribute of the color palette is exposed in a Java layer, the color palette can be directly extracted from the graphic object (e.g., using a native function of the graphic object) according to the position attribute. When the position attribute is hidden in a Java native layer, the device determines the offset value by identifying the location of the color palette in the graphic object (e.g., android.graphics.Bitmap object). According to the offset value, the color palette can be extracted by offsetting from a data header of the graphic object. In some embodiments, the data header of the graphic object stores various kinds of parameters at least including an offset value of the color palette. In some embodiments, the offset value can be a known value when the version of the Android is given. By parsing codes of the Java native layer of the Android OS, the offset value can be determined (e.g., using a native function of the graphic object).

In some embodiments, when the GPU retrieves the graphic object through the API (e.g., OpenGL API and/or Open GLES API), the GPU can be triggered to render the graphic object with an acceptable format at least through the GPU processing module (e.g., the GPU processing module 136 as shown in FIG. 1, e.g., the OpenGL or Open GLES). In some embodiments, as shown in FIGS. 2 and 3, for rendering the image 240 for display, the GPU (e.g., through the GPU processing module 136 as shown in FIG. 1) is triggered to render the source graphic according to the set of index values received in the first acceptable graphic format of the API (e.g., the Open GLES API) and the palette received in the second acceptable graphic format of the API (e.g., the Open GLES API). The rendering can be processed in various ways. In some embodiments, according to the color palette received in the second acceptable graphic format, the set of index values received in the first acceptable graphic format is transformed into a set of target color values by a value transformation module (e.g., the fragment shading module 1362 in FIG. 1). The set of target color values includes a respective color value for each pixel of the source graphic. The source graphic is rendered according to the set of target color values e.g., by the rendering module 1364 in FIG. 1.

In some embodiments, the fragment shading module (e.g., the fragment shading module 1362 in FIG. 1) can be triggered to complete the rendering. The fragment shading module samples each index values of set of index values received in the first acceptable graphic format, and uses each index value of the set of index values received in the first acceptable graphic format as a texture to generate a first respective shading result. The fragment shading module samples each index value of the second acceptable graphic format according to the first respective shading result, and shades the sampled respective index values to generate a second respective shading result, i.e., the set of target color values. The rendering module (e.g., the rendering module 1364 in FIG. 1) renders the graphic according to the second shading results. The second shading results may include a set of colors and a single depth value associated with the source graphic.

Figure 7:
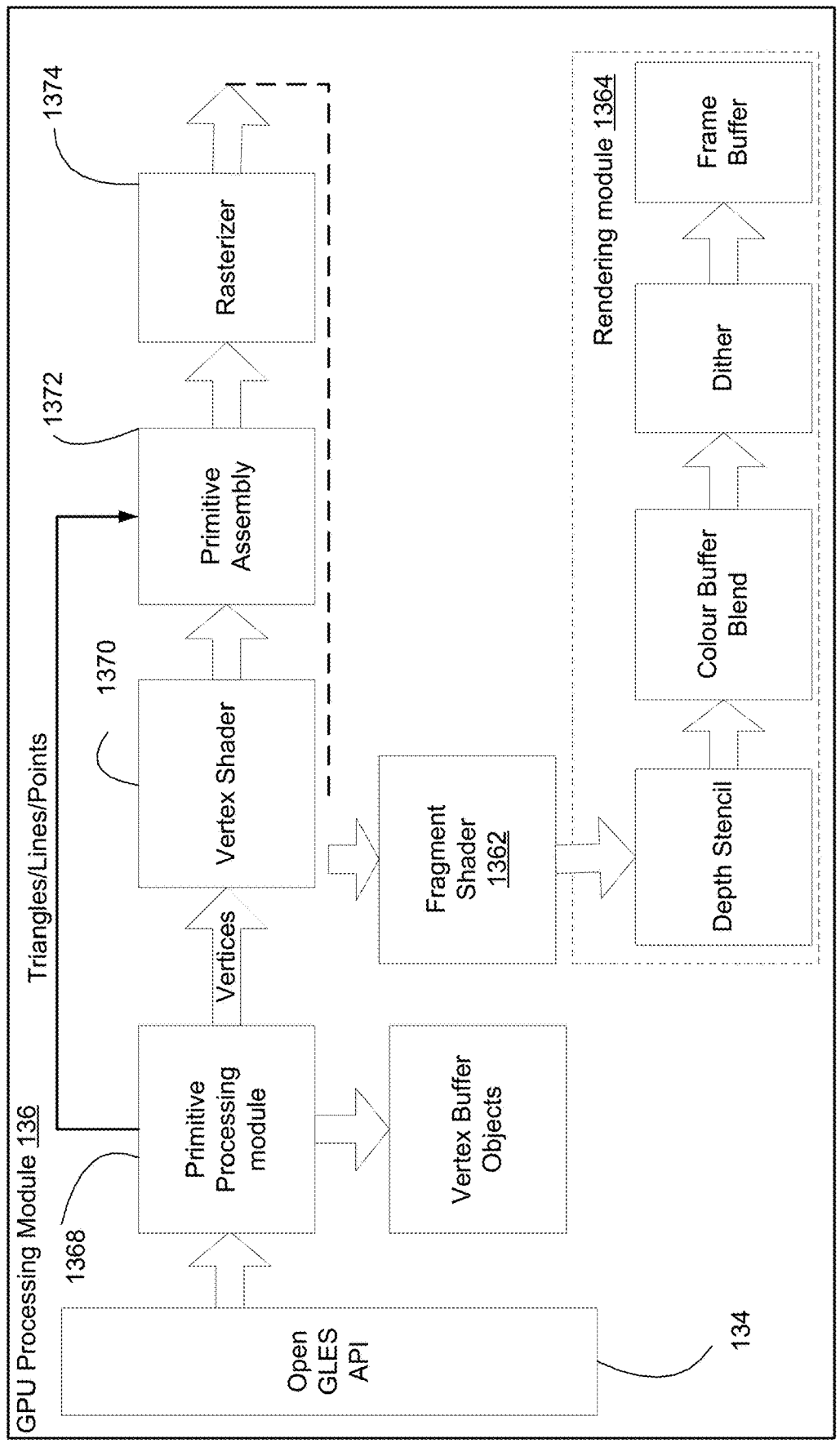
FIG. 7 is a block diagram of an exemplary graphical processing unit in accordance with some embodiments.

In some embodiments, the exemplary GPU processing module 136 uses an Open GLES API, and includes a fragment shader 1362, the rendering module 1364, and other modules 1366. As shown in FIG. 7, the exemplary GPU processing module 136 implements existing technical framework of the Open GLES 2.0 programmable pipeline, except the fragment shader 1362. The other modules 1366 include a primitive processing module 1368, a vertex shader 1370, a primitive assembly 1372, and a rasterizer 1374. The rendering module 1364 functions to complete remaining process by receiving output of the fragment shader 1362 (e.g., the second shading results). In some embodiments, the fragment shader 1362 transforms the set of index values provided in the first acceptable graphic format into a set of intermediate color values. Each intermediate color value of the set of intermediate color values corresponds to a respective pixel in the original graphic. The fragment shader 1362 obtains a respective channel component value of each intermediate color value of the set of intermediate color values. The fragment shader 1362 uses the respective channel component value of each intermediate color value of the set of intermediate color values as a coordinate for sampling a respective color value of the color palette provided in the second acceptable graphic format. For each intermediate color value of the set of intermediate color values, the fragment shader 1362 assigns the respective color value that is sampled from the color palette according to the coordinate specified in the respective channel component value of the intermediate color value to the respective pixel of the source graphic that corresponds to the intermediate color value.

In some embodiments, the fragment shader 1362 samples each index value of the first acceptable graphic format, and shades each index value of the first acceptable graphic format in a regular manner to generate a first respective shading result. For example, the fragment shader 1362 retrieves output of the other modules 1366, and take a single fragment as input (e.g., each index value of the first acceptable graphic format) and produce a single fragment as output (e.g., each first respective shading result corresponding to the respective index value, e.g., each intermediate color value corresponding to the respective index value). For example, the fragment shader 1362 samples the u_texture output from other modules 1366 in accordance with a coordinator v_texCoord. The u_texture is the set of index values in the first acceptable graphic format of the Open GLES API stored in the first texture unit of the GPU. The v_texCoord is two-dimensional and is retrieved from processing of the other modules 1366 (e.g., the vertex shader) with the input, through the Open GLES API, of the set of index values of the first acceptable graphic format. The fragment shader 1362, using e.g., function texture2D(u_texture, v_texCoord), shades each index values of the first acceptable graphic format to generate a first respective shading result (e.g., gl_FragColor). Texture2D(u_texture, v_texCoord) functions to retrieve the first shading result (e.g., intermediate color value) in association with u_texture according to the v_texCoord.

The following program codes are cited for reference.

```
precision mediump float;
varying vec2 v_texCoord;
uniform sampler2D u_texture
void mian( ) {
    gl_FragColor = texture2D(u_texture, v_texCoord);
}
```

The fragment shader 1362 further samples each index values of the second acceptable graphic format according to the first respective shading result, and shades the sampled respective index values (e.g., the intermediate color values) to generate a second respective shading result, i.e., the set of target color values. The first shading result (e.g., the set of intermediate color values) correspond to the set of pixels in the original graphic, respectively. Specifically, the fragment shader 1362 obtains a respective channel component value of each intermediate color value of the set of intermediate color values. The fragment shader 1362, uses the respective channel component value of each intermediate color value of the set of intermediate color values as a coordinate for sampling a respective color value of the color palette provided in the second acceptable graphic format. For each intermediate color value of the set of intermediate color values, the fragment shader 1362, using e.g., function texture2D(u_palette, vec2(texture2D(u_texture, v_texCoord).a, 0), assigns the respective color value ((e.g., gl_Frag-Color)) that is sampled from the color palette according to the coordinate specified in the respective channel component value of the intermediate color value to the respective pixel of the source graphic that corresponds to the intermediate color value.

The following program codes are cited for reference.

```
precision mediump float;
varying vec2 v_texCoord;
uniform sampler2D u_texture;
uniform sampler2D u_palette;
void mian( ) {
    texture2D(u_palette, vec2(texture2D(u_texture, v_texCoord).a, 0));
}
```

The second shading results (second shading results) are the set of target color values which are output of the fragment shader 1362 for further rendering by the rendering module. The rendering module (e.g., the rendering module 1364 in FIGS. 1 and 7) renders the graphic for display (e.g., the image 240 in FIG. 3) according to the second shading results.

The following example illustrates the disclosed graphic processing method in various embodiments by processing a source graphic provided in the indexed PNG format with a DPI of 640*640 (e.g., the source image 210 in FIG. 3) to finally render an image (e.g., the image 240 in FIG. 3) for display through use of the decoding module 122 and the GPU processing module 136 of the OpenGLES (as illustrated in FIGS. 1 and 7) under the Android OS. The graphic processing performances such as listed in FIG. 6 greatly improves the performance of the typical decoding and rendering of the source graphic provided in RGBA format with a DPI of 640*640. The source image 210 in the indexed PNG format provides one-dimensional array of index values, and each pixel of the source image stores a respective index value (e.g., in a byte, 8 bits). The source image 210 is indexed decoded by generating an android.graphics.Bitmap object (e.g., the graphic object 220 in FIG. 4), e.g., by running BitmapFactory.decode( ) with a setting parameter (e.g., options.inPreferredConfig=null). The android.graphics.Bitmap object is a Java object with an indexed color format, having a first data component that is one-dimensional array of index values (e.g., the set of index values in FIG. 4), and a color palette with 256 colors (e.g., the set of color values in FIG. 4) stored in the Java native layer. FIG. 4 shows each pixel (e.g., a pixel 250) of the image 240 is represented by a respective index value (e.g., the index value 2). The index value 2 identifies a corresponding color (e.g., the color value 2) in the color palette 2226.

The first data component 2222 and the second data component 2224 are extracted from the android.graphics.Bitmap object. The first data component of the android.graphics.Bitmap object is not acceptable by the OpenGlES API 134 (FIG. 1). The first data component is transformed with another format as an image encoded in a single channel image format (e.g., Alpha 8_translucent format), which is acceptable and transmittable by the Open GLES API. The second data component is also transformed as a two-dimensional texture (e.g., the color palette 2226 has a two-dimensional texture of 256*1), which is acceptable and transmittable by the Open GLES API. The transmitted image and the texture are respectively stored in two texture units of the GPU for further processing.

The transmitted image having set of index values is pre-processed into an image with a set of intermediate color values by the modules 1366 and the fragment shading module 1362 (FIGS. 1 and 7). The modules 1366 and the fragment shading module 1362 further process the pre-processed image with the set of intermediate color values to generate the set of target color values. The processing includes the step of obtaining a respective channel component value (e.g., the Alpha_8 format value) of each intermediate color value, using the respective channel component value as a coordinate for sampling a respective color value of the color palette, assigning the respective sampled color value to the respective pixel of the source graphic 210 that corresponds to the intermediate color value. The rendering module 1364 (as shown FIGS. 1 and 7) renders the set of target color values to generate the graphic 240 (as shown in FIG. 3) for display.

FIGS. 5A-5D are flowcharts of a method 500 for processing graphics using an Open GLES API. In some embodiments, a device including one or more processors and memory (e.g., the device 100 as shown in FIG. 1) executes the method (e.g., the method as illustrated in FIGS. 2, 3, 5A-5D) for processing graphics using an OpenGL Embedded Systems Application Programming Interface (Open GLES API).

In method 500, the device 100 retrieves (502) (e.g., step A in FIGS. 2 and 3) a source graphic (e.g., a source graphic in an indexed color format (e.g., an indexed PNG format), a source graphic in the BMP format, a source graphic in the JPEG format, etc.). In some embodiments, the source graphic is an image frame from a video. In some embodiments, the source graphic is an image of a logo. In some embodiments, the source graphic is an image of a background for a user interface.

The device 100 decodes (504) (e.g., step B in FIGS. 2 and 3) the source graphic to generate a graphic object (e.g., an android.graphics.Bitmap object, or a data object of another data type that does not conform to any of the data input formats of the OpenGLES API. The graphic object includes a set of index values and a color palette, the set of index values includes a respective index value for each pixel of the source graphic, and the respective index value for each pixel of the source graphic identifies a corresponding color in the color palette for the pixel of the source graphic. In some embodiments, the android.graphics.Bitmap object has a first data component that is a one-dimensional array of index values, and another data component that is a one-dimensional array of color values, and the android.graphics.Bitmap object provides the functions for accessing and extracting the data components. In some embodiments, specially designed code is used to extract the data components from the android.graphics.Bitmap object.

The device 100 provides (506) (e.g., step C in FIGS. 2 and 3) the graphic object to a Graphical Processing Unit (GPU) through the Open GLES API, including providing the set of index values in a first acceptable graphic format of the Open GLES API to the GPU (e.g., inputting the first data component (e.g., the index values) of the android.graphics.Bitmap object as an image encoded in a single channel image format (e.g., the Alpha_8 format)), and providing the color palette in a second acceptable graphic format of the Open GLES API to the GPU (e.g., inputting the second data component (e.g., the color palette) of the android.graphics.Bitmap object as a two-dimensional texture).

The device 100 triggers (e.g., step D in FIGS. 2 and 3) the GPU to render the source graphic according to the set of index values received in the first acceptable graphic format of Open GLES API and the palette received in the second acceptable graphic format of Open GLES API.

In some embodiments, rendering (step D) of the source graphic by the GPU includes (508): at the GPU that provides the Open GLES API: triggering a fragment shader of the Open GLES API to complete the rendering, including: sampling each index value of the set of index values received in the first acceptable graphic format; using each index value of the set of index values received in the first acceptable graphic format as a texture to generate a first respective shading result; sampling each index values of the second acceptable graphic format according to the first respective shading result; shading the sampled respective index values to generate a second respective shading result; and rendering the graphic according to the second shading results.

In some embodiments, rendering of the source graphic by the GPU includes (512): at the GPU that provides the Open GLES API: transforming, according to the color palette received in the second acceptable graphic format, the set of index values received in the first acceptable graphic format into a set of target color values; and rendering the source graphic according to the set of target color values. The set of target color values includes a respective color value for each pixel of the source graphic.

In some embodiments, transformation, according to the color palette received in the second acceptable graphic format, the set of index values received in the first acceptable format into the set of target color values includes (514): transforming the set of index values received in the first acceptable graphic format into a set of intermediate color values, wherein each intermediate color value of the set of intermediate color values corresponds to a respective pixel in the original graphic; obtaining a respective channel component value of each intermediate color value of the set of intermediate color values; using the respective channel component value of each intermediate color value of the set of intermediate color values as a coordinate for sampling a respective color value of the color palette received in the second acceptable graphic format; and, for each intermediate color value of the set of intermediate color values, assigning the respective color value that is sampled from the color palette according to the coordinate specified in the respective channel component value of the intermediate color value to the respective pixel of the source graphic that corresponds to the intermediate color value.

In some embodiments, providing the set of index values in a first acceptable graphic format of the Open GLES API to the GPU includes (516) extracting the set of index values from an image that is in an unacceptable graphic format of the Open GLES API; and providing the set of index values as an image that is in the first acceptable graphic format to the GPU. In some embodiments, the first acceptable graphic format is a single channel graphic format (e.g., Alpha_8). In some embodiments, the device is operated under an Android operating system, the respective index value for each pixel is stored as a single translucency value of the single channel graphic format, when the set of index values is provided to the GUP as the image that is in the first acceptable graphic format. In some embodiments, the device is operated under an Android operating system, the unacceptable graphic format is an original graphic format of an android.graphics-.Bitmap object that is generated through the decoding of the source graphic. In some embodiments, the first acceptable graphic format is distinct from the second acceptable graphic format. In some embodiments, the first acceptable graphic format is distinct from an original graphic format of the graphic object after the decoding of the source graphic, and the second acceptable graphic format is the same as the original graphic format of the graphic object after the decoding of the source graphic.

In some embodiments, providing the color palette in a second acceptable graphic format of the Open GLES API to the GPU includes (518) retrieving a position attribute of the color palette; according to the position attribute, positioning the color palette of the graphic object; and extracting the color palette from the graphic object in accordance with a result of the positioning. In some embodiments, the position attribute of the color palette is exposed in a Java layer such that the color palette is directly extracted from the graphic object (e.g., using a native function of the graphic object). In some embodiments, the position attribute is an offset value identifying a location of the color palette in the graphic object; and the color palette is extracted by offsetting from a data header of the graphic object according to the offset value. In some embodiments, the position attribute is hidden in a Java native layer. The retrieving of the position attribute of the color palette includes retrieving offset value by parsing codes of the Java native layer of the Android system.

In some embodiments, the device provides (520) the set of index values in the first acceptable graphic format of the Open GLES API to a first texture unit of the GPU; and provides (522) the color palette in the second acceptable graphic format of the Open GLES API to a second texture unit of the GPU. The first texture unit is distinct from the second texture unit.

In some embodiments, the source graphic is an image in an indexed color format. Retrieving the source graphic includes (524) converting an original image that is to be rendered at the device into the image in the indexed color format. Each pixel of the image in the indexed color format is represented as a respective index value that identifies a respective color of the color palette.

In some embodiments, decoding the source graphics to generate the graphic object includes (526) generating the set of index values of the graphic object in a form of a two-dimensional pixel matrix. (e.g., stored in internal storage of the memory, without any compression).

In some embodiments, decoding the source graphic to generate the graphic object includes generating a Java object with a data type of android.graphics.Bitmap as the graphic object, and storing the java object with the android.graphics.Bitmap data type in a Java native layer.

It should be understood that the particular order in which the operations in FIGS. 5A-5D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 500 described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method for processing graphics using an OpenGL Embedded Systems Application Programming Interface (Open GLES API), comprising:
at a device including one or more processors and memory:
retrieving a source graphic;
decoding the source graphic to generate a graphic object, wherein:
the graphic object comprises a set of index values and a color palette,
the set of index values includes a respective index value for each pixel of the source graphic, and
the respective index value for each pixel of the source graphic identifies a corresponding color value in the color palette for the pixel of the source graphic;
providing the graphic object to a Graphical Processing Unit (GPU) through the Open GLES API, including providing the set of index values in a first acceptable graphic format of the Open GLES API to the GPU, and providing the color palette in a second acceptable graphic format of the Open GLES API to the GPU, wherein the set of index values and the color palette are processed separately in the GPU and the first acceptable graphic format corresponds to a one-dimensional matrix and the second acceptable graphic format corresponds to a two-dimensional matrix; and
triggering the GPU to render the source graphic according to the set of index values received in the first acceptable graphic format of Open GLES API and the color palette received in the second acceptable graphic format of Open GLES API, further including choosing a color value for each pixel of the source graphic from the color palette according to a corresponding one of the set of index values associated with the pixel of the source graphic.

2. The method of claim 1, wherein rendering of the source graphic by the GPU includes:
at the GPU that provides the Open GLES API:
triggering a fragment shader of the Open GLES API to complete the rendering, including:
sampling each index value of the set of index values received in the first acceptable graphic format;
using each index value of the set of index values received in the first acceptable graphic format as a texture to generate a first respective shading result;
sampling color values of the color palette received in the second acceptable graphic format according to the first respective shading result;
shading the sampled respective color values to generate a second respective shading result; and
rendering the graphic according to the second shading results.

3. The method of claim 1, wherein the rendering of the source graphic by the GPU includes:
at the GPU that provides the Open GLES API:
transforming, according to the color palette received in the second acceptable graphic format, the set of index values received in the first acceptable graphic format into a set of target color values, wherein the set of target color values includes a respective color value for each pixel of the source graphic; and
rendering the source graphic according to the set of target color values.

4. The method of claim 3, wherein the transforming includes:
transforming the set of index values received in the first acceptable graphic format into a set of intermediate color values, wherein each intermediate color value of the set of intermediate color values corresponds to a respective pixel in the original graphic;
obtaining a respective channel component value of each intermediate color value of the set of intermediate color values;
using the respective channel component value of each intermediate color value of the set of intermediate color values as a coordinate for sampling a respective color value of the color palette received in the second acceptable graphic format; and
for each intermediate color value of the set of intermediate color values, assigning the respective color value that is sampled from the color palette according to the coordinate specified in the respective channel component value of the intermediate color value to the respective pixel of the source graphic that corresponds to the intermediate color value.

5. The method of claim 1, wherein providing the set of index values in a first acceptable graphic format of the Open GLES API to the GPU includes:
extracting the set of index values from an image that is in an unacceptable graphic format of the Open GLES API; and
providing the set of index values as an image that is in the first acceptable graphic format to the GPU.

6. The method of claim 5, wherein, the first acceptable graphic format is a single channel graphic format.

7. The method of claim 6, wherein the device is operated under an Android operating system, and the respective index value for each pixel is stored as a single translucency value of the single channel graphic format, when the set of index values is provided to the GPU as the image that is in the first acceptable graphic format.

8. The method of claim 5, wherein:
the device is operated under an Android operating system, and
the unacceptable graphic format is an original graphic format of an android.graphics.Bitmap object that is generated through the decoding of the source graphic.

9. The method of claim 1, wherein the first acceptable graphic format is distinct from the second acceptable graphic format.

10. The method of claim 9, wherein:
the first acceptable graphic format is distinct from an original graphic format of the graphic object after the decoding of the source graphic, and
the second acceptable graphic format is the same as the original graphic format of the graphic object after the decoding of the source graphic.

11. The method of claim 1, including:
providing the set of index values in the first acceptable graphic format of the Open GLES API to a first texture unit of the GPU; and
providing the color palette in the second acceptable graphic format of the Open GLES API to a second texture unit of the GPU, wherein the first texture unit is distinct from the second texture unit.

12. The method of claim 1, wherein the source graphic is an image in an indexed color format and retrieving the source graphic includes:
converting an original image that is to be rendered at the device into the image in the indexed color format, wherein each pixel of the image in the indexed color format is represented as a respective index value that identifies a respective color of the color palette.

13. The method of claim 1, wherein decoding the source graphics to generate the graphic object includes generating the set of index values of the graphic object in a form of a two-dimensional pixel matrix.

14. The method of claim 1, wherein the device is operated under an Android operating system, and decoding the source graphic to generate the graphic object includes generating a Java object with a data type of android.graphics.Bitmap as the graphic object, and storing the java object with the android.graphics.Bitmap data type in a Java native layer.

15. A method for processing graphics using an OpenGL Embedded Systems Application Programming Interface (Open GLES API), comprising:
at a device including one or more processors and memory:
retrieving a source graphic;
decoding the source graphic to generate a graphic object, wherein:
the graphic object comprises a set of index values and a color palette,
the set of index values includes a respective index value for each pixel of the source graphic, and
the respective index value for each pixel of the source graphic identifies a corresponding color value in the color palette for the pixel of the source graphic;
providing the graphic object to a Graphical Processing Unit (GPU) through the Open GLES API, including providing the set of index values in a first acceptable graphic format of the Open GLES API to the GPU, and providing the color palette in a second acceptable graphic format of the Open GLES API to the GPU; and
triggering the GPU to render the source graphic according to the set of index values received in the first acceptable graphic format of Open GLES API and the color palette received in the second acceptable graphic format of Open GLES API, wherein providing the color palette in a second acceptable graphic format of the Open GLES API to the GPU includes:
retrieving a position attribute of the color palette;
according to the position attribute, positioning the color palette of the graphic object; and
extracting the color palette from the graphic object in accordance with a result of the positioning.

16. The method of claim 15, wherein:
the device is operated under an Android operating system, and
the position attribute of the color palette is exposed in a Java layer such that the color palette is directly extracted from the graphic object.

17. The method of claim 15, wherein:
the position attribute is an offset value identifying a location of the color palette in the graphic object; and
the color palette is extracted by offsetting from a data header of the graphic object according to the offset value.

18. The method of claim 17, wherein:
the device is operated under an Android operating system;
the position attribute is hidden in a Java native layer; and
the retrieving of the position attribute of the color palette comprises:
retrieving the offset value by parsing codes of the Java native layer of the Android system.

19. A device for processing graphics using an OpenGL Embedded Systems Application Programming Interface (Open GLES API), comprising:
one or more processors; and
memory having instructions stored thereon, the instructions, when executed by the one or more processors, cause the processors to perform operations including:
retrieving a source graphic;
decoding the source graphic to generate a graphic object, wherein:
the graphic object comprises a set of index values and a color palette,
the set of index values includes a respective index value for each pixel of the source graphic, and
the respective index value for each pixel of the source graphic identifies a corresponding color in the color palette for the pixel of the source graphic;
providing the graphic object to a Graphical Processing Unit (GPU) through the Open GLES API, including providing the set of index values in a first acceptable graphic format of the Open GLES API to the GPU, and providing the color palette in a second acceptable graphic format of the Open GLES API to the GPU, wherein the set of index values and the color palette are processed separately in the GPU and the first acceptable graphic format corresponds to a one-dimensional matrix and the second acceptable graphic format corresponds to a two-dimensional matrix; and
triggering the GPU to render the source graphic according to the set of index values received in the first acceptable graphic format of Open GLES API and the palette received in the second acceptable graphic format of Open GLES API, further including choosing a color value for each pixel of the source graphic from the color palette according to a corresponding one of the set of index values associated with the pixel of the source graphic.

20. A non-transitory computer-readable medium having instructions stored thereon, the instructions, when executed by one or more processors cause the processors to perform operations including:
retrieving a source graphic;
decoding the source graphic to generate a graphic object, wherein:
the graphic object comprises a set of index values and a color palette,
the set of index values includes a respective index value for each pixel of the source graphic, and
the respective index value for each pixel of the source graphic identifies a corresponding color in the color palette for the pixel of the source graphic;
providing the graphic object to a Graphical Processing Unit (GPU) through the Open GLES API, including providing the set of index values in a first acceptable graphic format of the Open GLES API to the GPU, and providing the color palette in a second acceptable graphic format of the Open GLES API to the GPU, wherein the set of index values and the color palette are processed separately in the GPU and the first acceptable graphic format corresponds to a one-dimensional matrix and the second acceptable graphic format corresponds to a two-dimensional matrix; and triggering the GPU to render the source graphic according to the set of index values received in the first acceptable graphic format of Open GLES API and the palette received in the second acceptable graphic format of Open GLES API, further including choosing a color value for each pixel of the source graphic from the color palette according to a corresponding one of the set of index values associated with the pixel of the source graphic.

\* \* \* \* \*